United States Patent [19]

Borodin

[11] 4,273,156

[45] Jun. 16, 1981

[54] SHUTOFF DEVICE

[76] Inventor: Alexandr A. Borodin, Schelkovskoe shosse, 17, korpus 1, kv. 21, Moscow, U.S.S.R.

[21] Appl. No.: 134,749

[22] Filed: Mar. 28, 1980

[51] Int. Cl.[3] .............................................. F16K 35/06

[52] U.S. Cl. ............................... 137/601; 137/246.23; 137/614.11; 137/802; 251/89

[58] Field of Search ................... 137/237, 246, 246.15, 137/246.23, 601, 613, 614.11, 802; 251/89, 369

[56] References Cited

FOREIGN PATENT DOCUMENTS 2722733 11/1978 Fed. Rep. of Germany ...... 137/614.11

*Primary Examiner*—Robert G. Nilson

*Attorney, Agent, or Firm*—Fleit & Jacobson

[57] ABSTRACT

The shutoff device for closing a large cross-sectional area gas duct comprises a lock chamber defined by the gas duct walls and the two rows of swivel louvre grills held to the housing of the shutoff device which accommodates also a mechanical actuator, said louvre grills being arranged in the gas duct at an angle to the vertical plane in such a manner as to be spaced more widely apart in the top portion of the gas duct than in the bottom portion thereof. When the gas duct is being closed the lock chamber is filled with bulk free-flowing material from the top hopper located in the gas dust upper portion, whereas when the gas duct is being opened, the lock chamber is emptied of said bulk material, which is free to pour by gravity into the bottom receiving hopper, both of said hoppers being interconnected through a conveyer for the bulk material to return to the top hopper.

3 Claims, 2 Drawing Figures

SHUTOFF DEVICE

TECHNICAL FIELD

This invention relates to the field of power engineering and metallurgy, and is applicable predominantly at heat-electric generating plants and in furnaces operating in combination with heat recovery arrangements. The invention can find application in chemical and some other industries.

BACKGROUND ART

Cross-sectional areas of gas ducts along which gaseous fluids are conveyed, are known to greatly increase with evergrowing unit power of plants and arrangements made use of in power engineering, metallurgy, and some other fields of engineering.

One prior-art shutoff device for closing a large-area gas duct is known to be of the flapper type and to comprise a housing, a closing element with a mechanical actuator, and a sealing seat. The closing element is made as a heavy disk- or plate-shaped flapper (cf. journal "Gas Turbine World", March 1976, p. 53).

Increasing the size of such closing elements would increase their weight and involve difficulties in providing gas-tightness and heat insulation of the gas duct segments being shut off; this, in turn, necessitates the application of a mechanical actuator capable of developing considerable forces required to operate such shutoff devices, as well as the provision of some additional elements and contrivances in the construction of such shutoff devices, adapted to damp the stroke of said element against the sealing seat and to improve gas tightness of said devices.

Another shutoff device is known (cf. USSR Inventor's Certificate No. 567,896 cl.F23L 13/02, issued 1974) to comprise two gate elements mounted pivotally from the vertical position through 90° to the opposite sides. When in the vertical position said gate elements establish, along with the gas duct walls, a lock chamber provided in its top portion with an engorgement to be filled with a loose refractory materials.

The afore-discussed construction arrangement of the shutoff device, when applied to close a large cross-sectional area gas duct, involves the employment of a mechanical actuator capable of developing great forces on account of heavyweight gate elements said actuator is to operate. The loose material filling the lock chamber tends to thrust out the gate elements and is liable to run down through the resultant gap, thus deteriorating the tightness of the gas-duct segment being shut off.

One more shutoff device for closing a large-area gas duct, assumed by us as the prototype, is known to comprise a housing, a closing element shaped as a louvre grill, wherein the louvres can swivel round their pivot pins from a mechanical actuator provided on the housing (cf. French Patent No. 2,169,330 issued Oct. 12, 1973, class F24f 13/14).

Increased overall size of the closing device made as a louvre grill and applied to shut off a large-area gas duct, causes higher leaks of the fluid handled through said closing device, owing to the fact that large-sized grill louvres cannot be fitted tightly against one another, which results also in considerable heat losses to the surrounding atmosphere.

It is an aobject of the present invention to provide a shutoff device of the louvre type, making it possible to eliminate leaks of the gaseous fluids being handled through the closing element.

It is another object of the present invention to provide a shutoff device of the louvre type, which makes it possible to reduce heat losses to the surrounding atmosphere.

It is one more object of the present invention to eliminate hanging-up of the sealing loose material in the lock chamber.

BRIEF DESCRIPTION OF THE ESSENCE OF THE INVENTION

Said and other objects are accomplished due to the fact that in a shutoff device for closing a gas duct made in the shape of a lock chamber defined by the walls of the gas duct and two rows of swivel louvre grills held to the housing of the device, according to the invention, the louvre grills are arranged in the gas duct at an angle to the vertical plane and are spaced more widely apart in the gas duct top portion than in the bottom portion thereof.

In addition, the space of the lock chamber established by these grills and the gas duct walls, is defined by a top hopper in the upper portion of the lock chamber, and by a bottom receiving hopper in the lower portion of said chamber.

When the gas duct is being closed the lock chamber is filled with bulk free-flowing material from the top hopper, and when the gas duct is being opened the lock chamber is emptied of the bulk material, which is poured by gravity to the bottom receiving hopper. To return the bulk material from the bottom to the top hopper a conveyer is provided.

The pivot pin of each of the louvres of the inclined swivel grills is arranged eccentrically with respect to the centre of gravity of the louvre cross-section so that when the duct is being closed, the louvre portion located above the pivot pin covers a lesser area of the gas duct than the other louvre portion located below the pivot pin.

The louvres of the swivel louvre grills are provided with a shaker mechanism.

The thus-established lock chamber in a large-area gas duct is conducive to a reduced amount of leaks of the gaseous fluid being conveyed and to less heat losses to the surrounding atmosphere, this being due to the fact that the bulk material filling the lock chamber when the gas duct is being closed, causes the swivel louvres to jam and prevents these from being opened by the forces resulting from a difference between the fluid pressure effective upstream of the swivel louvre grills and downstream of these. Apart from that, the bulk material serves as an irregular labyrinth seal, which additionally reduces the leaks of the fluid handled. It is thanks to heat-insulating properties of the bulk material that an additional reduction of heat losses to the surrounding atmosphere is attained.

An eccentrical arrangement of the louvres on their pivot pins, as well as application of a shaker mechanism make it possible to eliminate hanging-up of the bulk material in the lock chamber. The material may be made to hang up due to an ingress of high-temperature gases containing suspended solids, or due to the effect of the forces of gravity of the overlying beds of the bulk materials.

BRIEF DESCRIPTION OF THE DRAWINGS

In what follows the present invention is illustrated in a detailed description of an exemplary embodiment thereof and in the appended drawings, wherein.

DETAILED DESCRIPTION OF THE INVENTION

Figure 1:
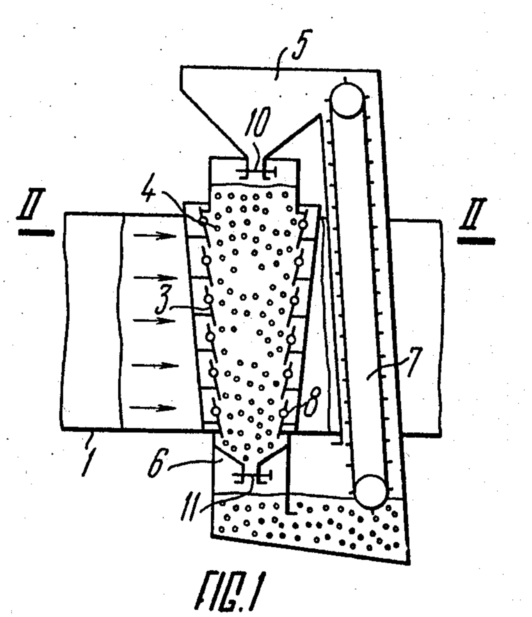
FIG. 1 is a shutoff device for closing a large-area gas duct, according to the invention, shaped as a lock chamber.

The shutoff device for closing large-area gas duct 1 (FIG. 1) comprises inclined swivel louvre grills 2 arranged in two rows within said gas duct 1 and made up of swivel louvres 3. The louvre grills 2 and the walls of the gas duct 1 establish a lock chamber 4, which is defined from above by a top hopper 5 for the bulk material to charge, and from below, by a bottom receiving hopper 6, both of the hoppers 5 and 6 being interconnected through a conveyer 7 for the bulk material to return to the top hopper 5. The cross-sectional area of the lock chamber 2 decreases as along the direction of motion of the bulk material. The louvres 3 are eccentrically mounted on pivot pins 8 so that when the gas duct is being closed, the louvre portion located above the pivot pin covers a lesser area of the gas duct than the other louvre portion located below the pivot pin.

Figure 2:
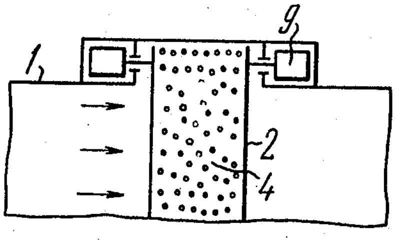
FIG. 2 is a section taken along line II—II of FIG. 1.

The shutoff device is provided with a shaker mechanism 9 (FIG. 2) connected to the louvres 3 of the louvre grills 2. A slide gate 10 is provided in the bottom portion of the hopper 5, while a slide gate 11 is located in the bottom portion of the lock chamber 4.

The shutoff device of the present invention operates as follows.

In order to shut off the gas duct 1 the mechanical actuator (not shown) of the swivel louvres 3 is turned on to cause the latter to assume the position "closed". Thereupon the slide gate 10 of the hopper 5 is opened to fill the lock chamber 4 with the bulk material, such as metallic or ceramic globules, which causes the louvres 3 to jam in the "closed" position and prevents the louvres from being opened by the forces resulting from a difference between the fluid pressure effective before and past the shutoff device. Once the lock chamber 4 has been filled with the bulk material the slide gate 10 is closed. In order to open the cross-sectional area of the gas duct 1 for the fluid handled to pass, the mechanical actuator (not shown) of the stop-up slide gate 11 is turned on to open the latter, and the bulk material from the lock chamber 4 whose cross-sectional area decreases along the direction of the bulk material travel, is poured down by gravity to the receiving hopper 6. Turned on simultaneously with the mechanical actuator of the stop-up slide gate are the actuator (not shown) of the shaker mechanism 9, which imparts jigging motion to the louvres 3 so as to eliminate possible hanging-up of the bulk material, and the actuator (not shown) of the conveyer 7, whereby the bulk material is transferred from the receiving hopper 6 to the top hopper 5.

Once the entire bulk material has been poured to the receiving hopper 6, the slide gate 11 is closed, and the shaker mechanism 9 is turned off. Just after the slide gate 11 has been closed the actuator of the louvres 3 is turned on for the latter to assume either the "closed" or an intermediate position. As soon as the hopper 5 gets filled with the bulk material the actuator of the conveyer 7 is turned off.

What is claimed is:

1. A shutoff device for closing a large-area gas duct, comprising a gas duct; two rows of swivel louvre grills arranged in said gas duct at an angle to the vertical plane and spaced apart more widely in the top portion of said gas duct than in the bottom portion thereof; a hopper located above said swivel louvre grills, and a receiving hopper located under the swivel louvre grills so as to establish a lock chamber confined within said hoppers, the gas duct walls and the swivel louvre grills; said lock chamber being filled, when the gas duct is being closed, with bulk material from said hopper, said bulk material causing the swivel louvres of the grills to jam, and when the gas duct is being opened, said lock chamber is emptied of the bulk material, which is poured down by gravity to said receiving hopper; said hopper and receiving hopper being interconnected through a conveyer for the bulk material to return to the top hopper.

2. A shutoff device as claimed in claim 1, wherein the swivel louvre grills are arranged obliquely in the gas duct and incorporate swivel louvres whose pivot pin is arranged eccentrically with respect to the centre of gravity of said louvres so that the louvre portion located above the pivot pin thereof, covers a lesser area of the gas duct, when the latter is being closed, than the other louvre portion located below the pivot pin.

3. A shutoff device as claimed in claim 2, wherein the louvres of the inclined swivel louvre grills provided in the gas duct, are provided with a shaker mechanism.

* * * * *